US008561998B2

(12) United States Patent
Marques et al.

(10) Patent No.: US 8,561,998 B2
(45) Date of Patent: Oct. 22, 2013

(54) NITRIDED PISTON RING RESISTANT TO THE PROPAGATION OF CRACKS

(75) Inventors: Gisela Ablas Marques, Jundiaí (BR); André Ferrarese, São Paulo (BR); Claudinei José de Oliveira, Itajubá (BR); Jan Vatavuk, São Paulo (BR)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 13/519,219

(22) PCT Filed: Dec. 21, 2010

(86) PCT No.: PCT/BR2010/000427
§ 371 (c)(1),
(2), (4) Date: Oct. 15, 2012

(87) PCT Pub. No.: WO2011/079360
PCT Pub. Date: Jul. 7, 2011

(65) Prior Publication Data
US 2013/0049304 A1    Feb. 28, 2013

(30) Foreign Application Priority Data

Dec. 29, 2009   (BR) .................................. 0905228

(51) Int. Cl.
*F16J 9/26*    (2006.01)
(52) U.S. Cl.
USPC ........................................................ 277/443
(58) Field of Classification Search
USPC ........................................................ 277/443
See application file for complete search history.

(56) References Cited

U.S. PATENT DOCUMENTS

| 4,570,946 A | | 2/1986 | Tsuchiya et al. |
| 4,579,355 A | * | 4/1986 | Koorooki .................. 277/443 |
| 4,966,751 A | | 10/1990 | Kaede et al. |

(Continued)

FOREIGN PATENT DOCUMENTS

| JP | 58-027860 | 2/1983 |
| JP | 61-069957 | 4/1986 |

(Continued)

OTHER PUBLICATIONS

International Searching Authority, International Search Report and Written Opinion for International Application No. PCT/BR2010/000427, mailed Jul. 4, 2011, 17 pages, European Patent Office, The Netherlands.

(Continued)

*Primary Examiner* — Vishal Patel
*Assistant Examiner* — L. Susmitha Koneru
(74) *Attorney, Agent, or Firm* — Alston & Bird LLP

(57) ABSTRACT

This invention refers to the solution of problem of spalling of the nitrided layer in piston rings for Flex-fuel engines, without jeopardizing the wear resistance, suggesting for such purpose a nitrided piston ring (100,100') equipped with two nitrided layers (1,2), with metallic base (3) composed mainly of iron and whose superficial hardness presented is of about 800 Vickers, decreasing in a substantially linear manner up to about 400 Vickers for a distance to the surface of up to 90 microns (μm).

18 Claims, 10 Drawing Sheets

Invention

Invention

(56) References Cited

U.S. PATENT DOCUMENTS

| | | | | |
|---|---|---|---|---|
| 5,484,662 | A | * | 1/1996 | Rao .................... 428/553 |
| 5,605,741 | A | * | 2/1997 | Hite et al. .................... 277/443 |
| 6,726,216 | B2 | * | 4/2004 | Horn et al. .................... 277/434 |
| 7,291,384 | B2 | * | 11/2007 | Obara et al. .................... 428/315.5 |
| 7,833,636 | B2 | * | 11/2010 | Araujo et al. .................... 428/697 |
| 2004/0040631 | A1 | * | 3/2004 | Takahashi et al. .................... 148/226 |
| 2004/0262847 | A1 | | 12/2004 | Inoue |
| 2007/0187002 | A1 | | 8/2007 | Takahashi et al. |
| 2010/0001474 | A1 | * | 1/2010 | Araujo et al. .................... 277/443 |
| 2010/0158745 | A1 | * | 6/2010 | Ohishi et al. .................... 420/67 |
| 2010/0295251 | A1 | * | 11/2010 | Sekiya et al. .................... 277/443 |
| 2010/0319647 | A1 | * | 12/2010 | Ogawa et al. .................... 123/193.2 |
| 2012/0090462 | A1 | * | 4/2012 | Pelsoeczy .................... 92/169.1 |
| 2012/0145289 | A1 | * | 6/2012 | Ohishi et al. .................... 148/589 |
| 2012/0248710 | A1 | * | 10/2012 | Favaron et al. .................... 277/443 |

FOREIGN PATENT DOCUMENTS

| | | |
|---|---|---|
| JP | 2002-317225 | 10/2002 |
| JP | 2007-278314 A | 10/2007 |
| WO | WO 98/19084 | 5/1998 |
| WO | WO 98/25017 | 6/1998 |

OTHER PUBLICATIONS

International Preliminary Examining Authority, International Preliminary Report on Patentability for International Application No. PCT/BR2010/000427, mailed Mar. 2, 2012, 20 pages, European Patent Office, Germany.

Dannemann Siemsen Bigler & Ipanema Moreira, Applicant's Response to the Written Opinion of Jul. 4, 2011, for International Application No. PCT/BR2010/000427, dated Oct. 21, 2011, 13 pages, The Netherlands.

* cited by examiner

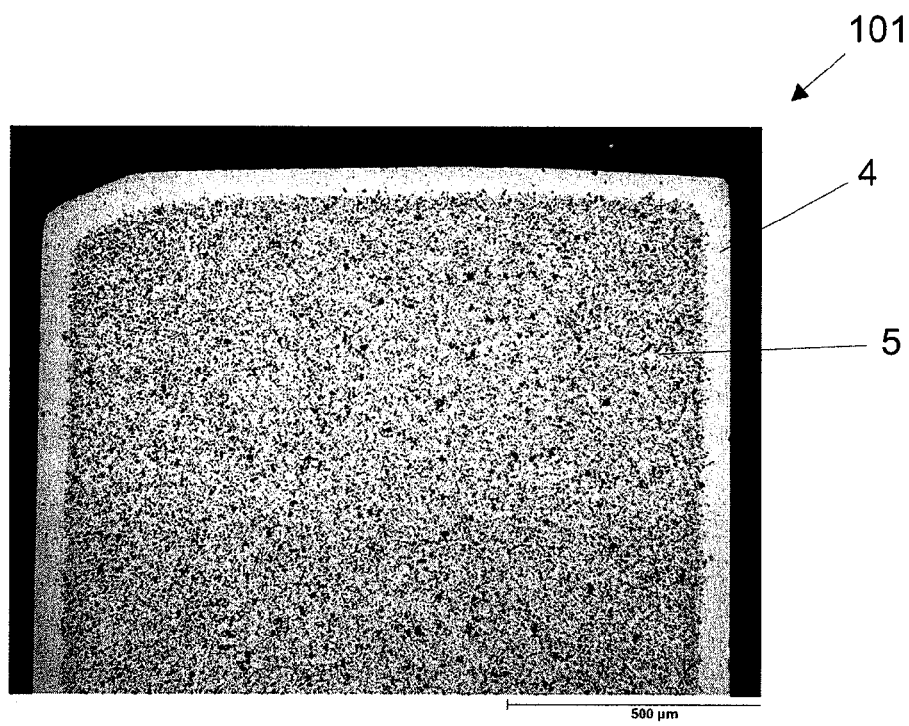
FIG. 4 Prior art
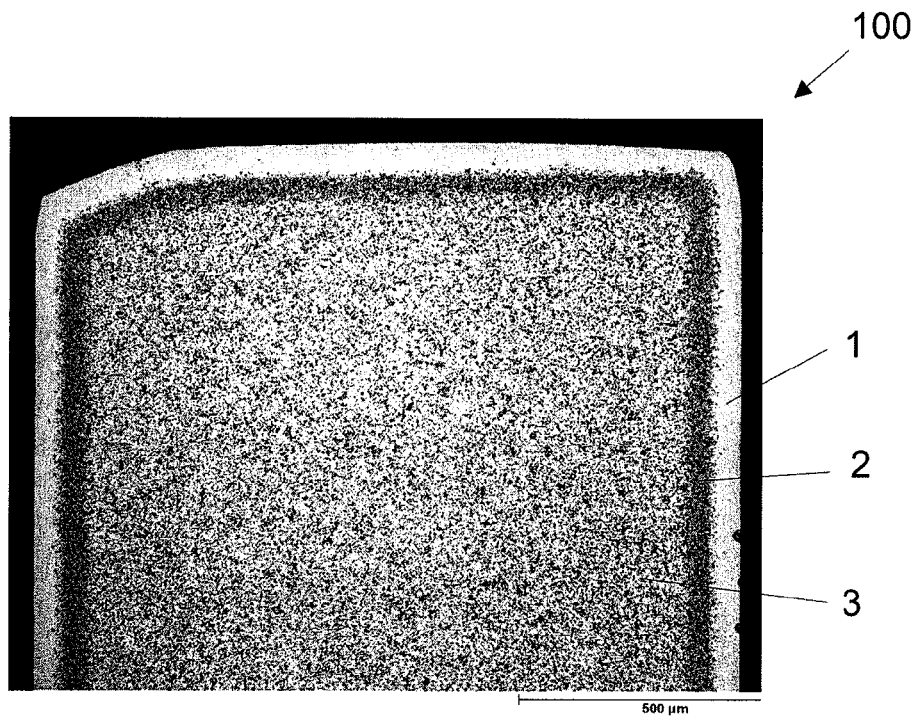
FIG. 5 Invention

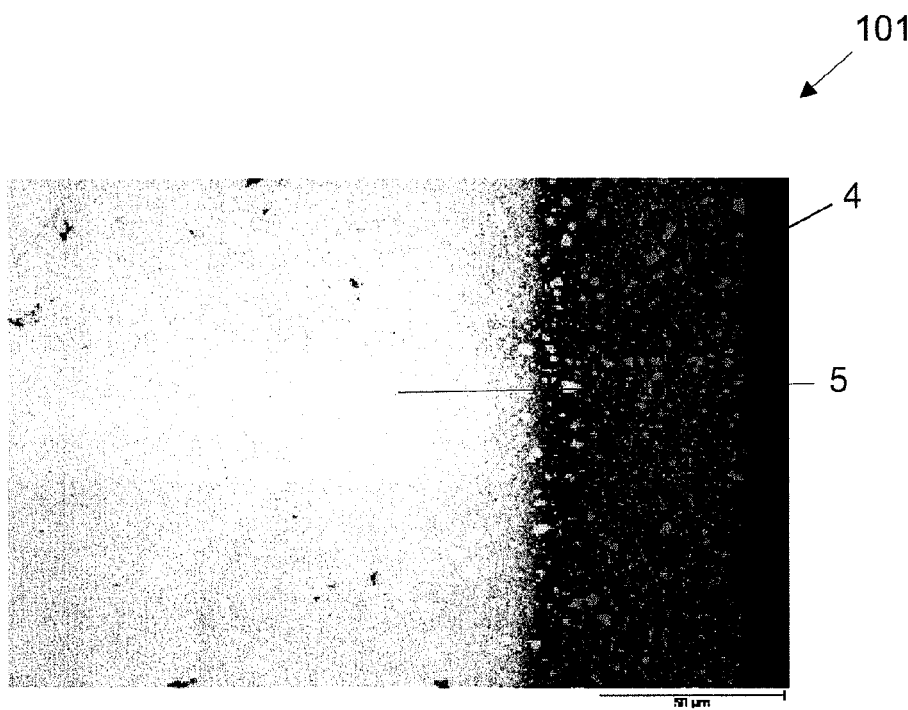
FIG. 6 Prior art
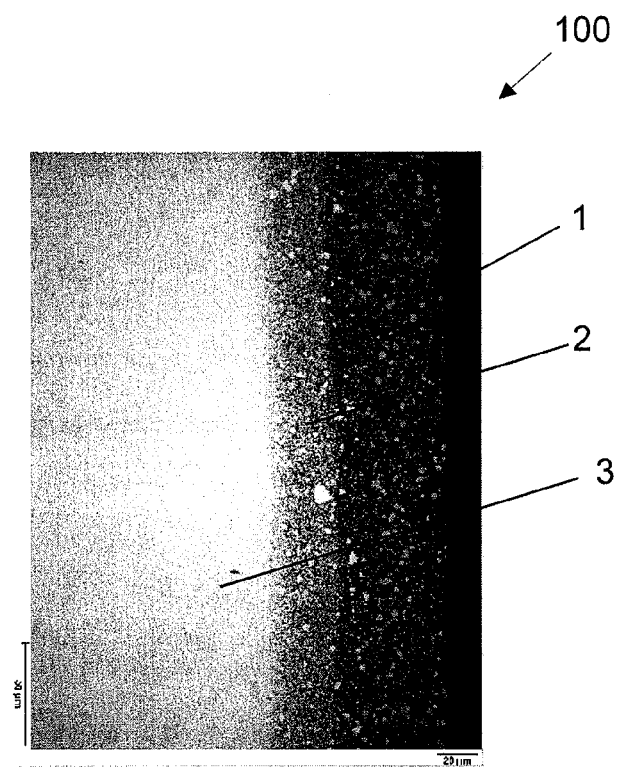
FIG. 7 Invention

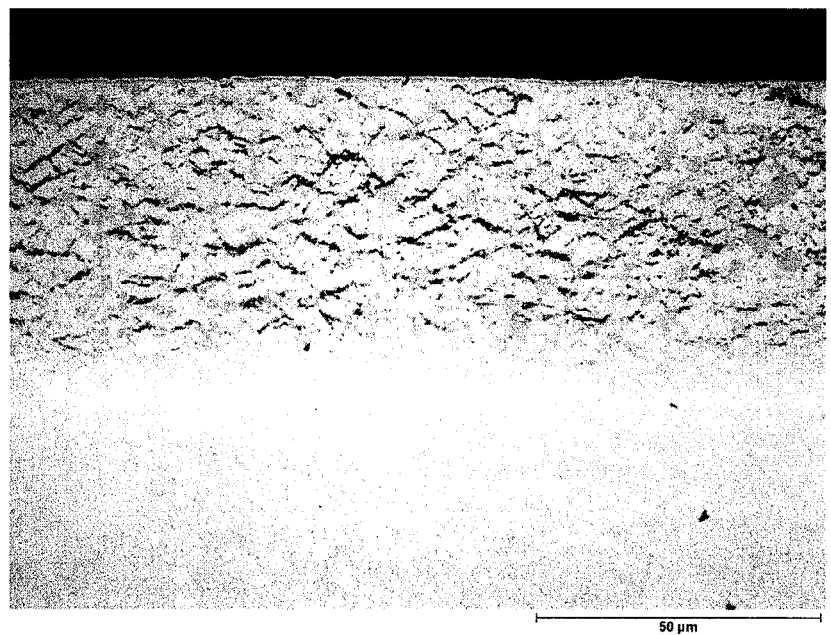
FIG. 9 Prior art
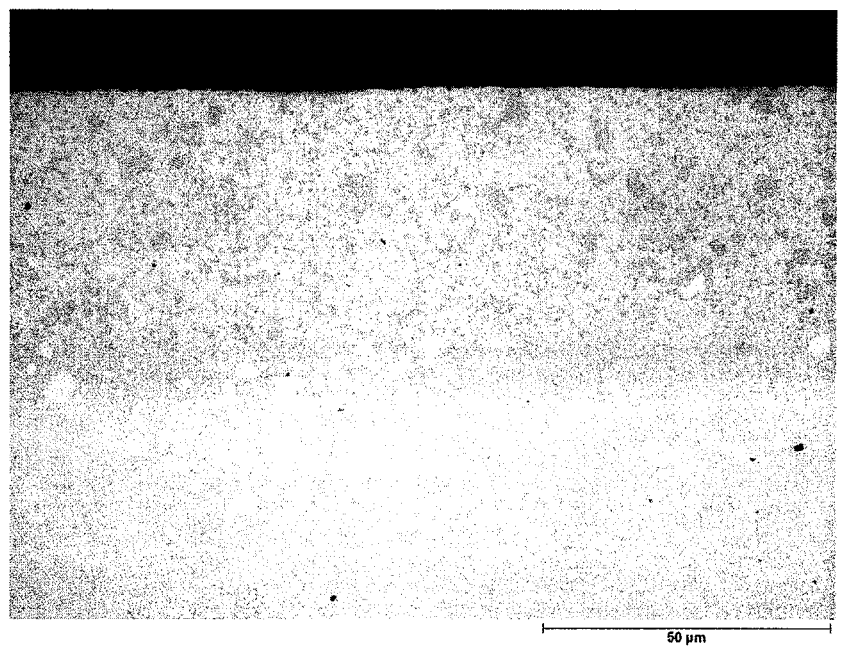
FIG. 10 Invention

FIG. 13 Prior art
FIG. 14 Invention

NITRIDED PISTON RING RESISTANT TO THE PROPAGATION OF CRACKS

CROSS REFERENCE TO RELATED APPLICATIONS

This application is a national stage application, filed under 35 U.S.C. §371, of International Application No. PCT/BR2010/000427, filed Dec. 21, 2010, which claims priority to Brazilian Patent Application No. PI0905228-3, filed Dec. 29, 2009, both of which are hereby incorporated by reference in their entirety.

BACKGROUND OF THE INVENTION

Related Field

This invention refers to a piston ring for use in internal combustion engines and, more particularly, to a compression ring for use in Flex-fuel engines, with considerable improvements in the properties of resistance to the spalling of the nitrided layer.

Nitriding

Nitriding is a kind of superficial treatment that aims at providing an improvement in the mechanical properties (in this particular case, of the sliding face of piston rings), especially for compression rings made of steel.

By means of FIG. 1, and merely to illustrate the nitriding process, we can observe the chemical-physical process of one of the simplest and most important nitriding forms, the gaseous nitriding. It is also possible to observe the dissociation of ammonia to nitrogen and the respective absorption by the steel. The ammonia, when in contact with the steel, dissociates, releasing atomic nitrogen, which can be later absorbed by the steel and dissolved interstitially in the iron (Fe). At the moment when the surface reaches a certain saturation level, the formation of nitrides is promoted through the mechanism of nucleation and growth, and a certain incubation period is necessary for such purpose.

In general, the nitriding treatment enables surfaces with higher hardness, through a superficial thermochemical treatment. In this treatment, the nitrogen is introduced in the α phase (ferrite), using a nitrogenous environment at a certain temperature aiming at reaching an increase in the hardness and wear resistance of the steel. This surface treatment provides a transformation of the material until a certain depth of the surface, maintaining the ductile and tenacious core where, consequently, there is no change of phase when the steel is cooled to room temperature. As generally known by experts in the subject, in all nitriding processes the most superficial area of the material is the one that receives more absorption of nitrogen and, as the distance from the interior of the material to the surface increases, the quantity of nitrogen absorbed decreases. Analogously, the hardness of the material is higher on the surface, decreasing slowly with the increased depth.

Among some of the advantages of nitriding, we should point out:

High superficial hardness with increased wear resistance;
High resistance to fatigue—formation of compressible forces on the surface of the steel;
High dimensional stability;
No risk of warping.

Flex-Fuel Engines

Ethyl alcohol is an inflammable material used as fuel in internal combustion engines, especially in Brazil, where it recently started being widely used with the launch of flex-fuel engines (which can operate with alcohol or gasoline, pure or mixed in any proportion).

Allowing the use of alcohol as fuel, the internal combustion engines running on gasoline were gradually adapted to also enable the use with ethanol; however, despite all the development in this area, some problems that generate disadvantages in the use of ethanol as fuel may appear. One of the most inconvenient ones is the higher wear that the piston rings suffer, worsened by lower lubrication conditions and higher work temperatures when the engine operates with ethanol.

In some Flex-fuel engines, there has been the occurrence of spalling of material of the coating nitrided superficial layer of the compression rings. The spalling occurs due to the combination of factors such as marginal lubrication conditions, high work temperatures and excessive advance of the engine ignition point, particularly applied when the flex-fuel engines operate with ethanol to promote an increase of the torque produced under partial loads. The excessive advance of the ignition point represents an excessive effort in the pistons and rings which may lead to the spalling of the material that is superficially treated in a much more serious manner than in the case of an engine running on gasoline.

Furthermore, the constant action of load and unload causes plastic deformations on the sliding surface of the rings, a fact that may result in subsuperficial cracks and the consequent loosing of the covering. This phenomenon is known in English as spalling, and in Portuguese as "espalação" or "destacamento", and in this text we will use the term "spalling".

The spalling of these fragments of the piston ring can cause serious operation problems such as scratches on the cylinder wall coming from the attrition between the ring and the cylinder and deterioration of the cylinder liner, jeopardizing the sealing of the cylinder and allowing the loss of compression and the passage of oil to the area of the engine combustion chamber. This type of problem may, in more serious cases, lead to the loss of the optimized operational characteristics of the engine, such as a significant reduction in the compression of the engine and also cause premature wear of the acting parts.

We should point out that this type of problem occurs especially in Flex-fuel engines that use ethanol as fuel.

The spalling phenomenon mentioned above can be especially observed in FIGS. 2 and 3. FIG. 2 shows the cracks and consequent spalling that occurred in a piston ring made of Gas Nitrided Steel—GNS of a Flex-fuel engine where ethanol was used as fuel. In turn, FIG. 3 describes a transverse section of a ring, equivalent to the one in FIG. 2, where it is easy to identify the appearance and respective propagation of cracks that caused the consequent spalling of the nitrided surface. As a technical characteristic to be explored in this report, we should mention that a GNS ring of the type presented in these figures has hardness of about 1000 superficial Vickers (Hv).

After repeated tests and respective laboratory observation, it was possible to observe that, usually, the cracks occur, in majority, perpendicularly to the sliding surface of the ring and that starting at a certain depth, where the hardness is lower, the cracks are deviated, and start to go parallel to the border between the nitrided layer and the base of the non nitrided material. As explained in the beginning of this report in the nitriding chapter, the surface area of the nitrided material absorbs more nitrogen, being transformed into a harder area than the more internal areas of the material, where, naturally, less nitrogen was absorbed and, consequently, are areas with lower hardness, that is, with higher tenacity. It is, therefore, reasonable to conclude that when finding an area of the material that is less hard, that is, more tenacious, the propagation of the crack towards the depth is not possible, forcing it to change the direction and propagate horizontally, in that area where the hardness of the substrate is still considerable.

Finally, we should note that the spalling of the nitrided surface of the rings occurs out of the sight of the user, and it may generate even more losses than the spalling of the ring itself, resulting in the disassembling of the engine for repair (always an expensive procedure).

Description of Related Art

The prior art discusses piston rings with good properties of resistance to spalling, although no document currently known anticipates the characteristics of the piston ring object of this invention.

U.S. Pat. No. 4,570,946 refers to a nitrided piston ring equipped with an external coating layer on its surface. The ring is first nitrided on its whole surface so that there is formation of a composed layer and a diffusion layer, where the composed layer is formed on the diffusion layer. After that, at least the composed layer is removed and an additional coating layer is applied, increasing the mechanical properties of the resulting ring.

The nitrided layers act in order to prevent the occurrence of wear of the ring due to repeated, inevitable shocks with the small channel of the piston, during the engine operation.

U.S. Pat. No. 4,966,751 refers to a steel for use, for example, in piston rings or rocker arms, which has good wear resistance, due to its chemical composition. With the purpose of having these good properties even better, the steel must be object of a nitriding procedure, especially in the place where it will have mechanical contact with another component. This document describes, at length, the steel, its main variations and composition.

The application for patent U.S. 2007/0187002 refers to a piston ring with high resistance to scuffing and fatigue, as well as its manufacturing process. The ring's base is made of stainless steel and the sliding layer is nitrided, including hard particles on its surface consisting of nitrites with dimensions that range from 0.2 to 2.0 μm, in that the larger diameter of them must be of 7 μm or less and must have a ratio of 5% to 30% of the respective areas.

The document of patent JP 58-27860 refers to a piston ring with enhanced wear resistance, corrosion and scuffing, having a steel base with martensitic structure through which countless particles of chromium carbide are uniformly dispersed with size from 3 to 30 μm. The dispersion of the particles in relation to the area occurs in a ratio from 3 to 20%. The ring includes a hardness of about 400-800 HV and, optionally, it receives an additional nitrided layer with superficial hardness of 800-1500 HV.

Document JP 61-69957 refers to a nitrided coating layer whose frailty is reduced by changing the structure of the externally positioned composed layer, which is object of a thermal treatment after its formation (nitriding of a ferrous metal).

The thermal treatment reduces the frailty of the composed layer and enables, more easily, to treat it later, in addition to rendering it porous and making it possible for it to be used like the layer and coating of a piston ring.

Finally, document JP 2002-317225 refers to a martensitic stainless steel with low content of chromium for use in piston rings, which has more resistance to fatigue, to wear and to high temperatures. The composition of this material includes 0.35% to 0.9% of C, 7% to 13% of Cr and 0.05% to 0.20% of N, in that the sliding contact surface of a ring formed with it must undergo a nitriding treatment.

PURPOSES OF THE INVENTION

It is, therefore, one of the purposes of this invention, to provide a nitrided piston ring for Flex-fuel engines, able to solve the spalling problems that may occur when this type of engine runs on ethanol as fuel.

It is also one of the purposes of this invention to guarantee high wear and spalling resistance of the nitrided surface of a piston ring by means of a coating that has superior resistance to the propagation of cracks.

BRIEF SUMMARY

The purposes of this invention are met by providing a nitrided piston ring with a metallic base composed mainly of iron to which a first layer is associated, the ring including additionally a second layer positioned between the base and the first layer, the first layer having at least 2% nitrogen in weight and maximum hardness of substantially 800 Vickers and the second layer having a percentage of carbon in weight at least fractionally superior to the percentage of carbon in weight present on the base and thickness higher or equal to at least 15 microns (μm).

The purposes of this invention are also met by means of a nitrided piston ring with metallic base composed mainly of iron to which one first layer is associated, the ring including additionally a second layer, the second layer being positioned between the base and the first layer, the first layer having at least 2% nitrogen in weight, the second layer having a percentage of carbon in weight at least fractionally superior to the percentage of carbon in weight present on the base (3) and the ring with a maximum hardness of substantially 800 Vickers, the hardness varying in a substantially linear manner until a minimum hardness of 400 Vickers at a depth of 85 microns (μm) counted as of its external surface or as of the most external portion of the first layer (1).

BRIEF DESCRIPTION OF THE FIGURES

This invention will be described in more details below based on examples of execution represented in the drawings. The figures show:

FIG. 4—a metallographic photograph of a nitrided piston ring in the prior art;

FIG. 5—a metallographic photograph of the piston ring object of this invention;

FIG. 6—a photograph of the microstructure of a nitrided piston ring in the prior art which reveals the presence of a diffusion layer;

FIG. 7—a photograph of the microstructure of the piston ring object of this invention which reveals the presence of two diffusion layers;

FIG. 9—a metallographic photograph of a nitrided piston ring in the prior art that reveals the presence of iron carbides on the nitrided layer;

FIG. 10—a metallographic photograph of the piston ring object of this invention that reveals the inexistence of iron carbides on the nitrided layer;

FIG. 13—a photograph of a nitrided piston ring in the prior art that reveals the result of a scratch test;

FIG. 14—a photograph of the piston ring object of this invention that reveals the result of a scratch test.

DETAILED DESCRIPTION OF VARIOUS EMBODIMENTS

This invention suggests a nitrided piston ring whose coating grants higher resistance to the formation and, especially, the propagation of cracks.

The piston ring includes a metallic base which is, preferably, but not mandatorily, composed of martensitic stainless steel with carbon content above 8%. The preferable application of the ring is a top compression ring for Flex-fuel engines, considering that it solves the problem regarding the spalling that may occur when this kind of engine uses ethanol as fuel.

Therefore, a nitrided product was successfully developed with characteristics of high ductility, exceptional reduction of formation and propagation of cracks, maintaining the desired characteristics regarding the wear resistance. Naturally, the measuring of the superior values met is referring to the piston rings in the prior art, also called typical GNS ring.

Figure 1:
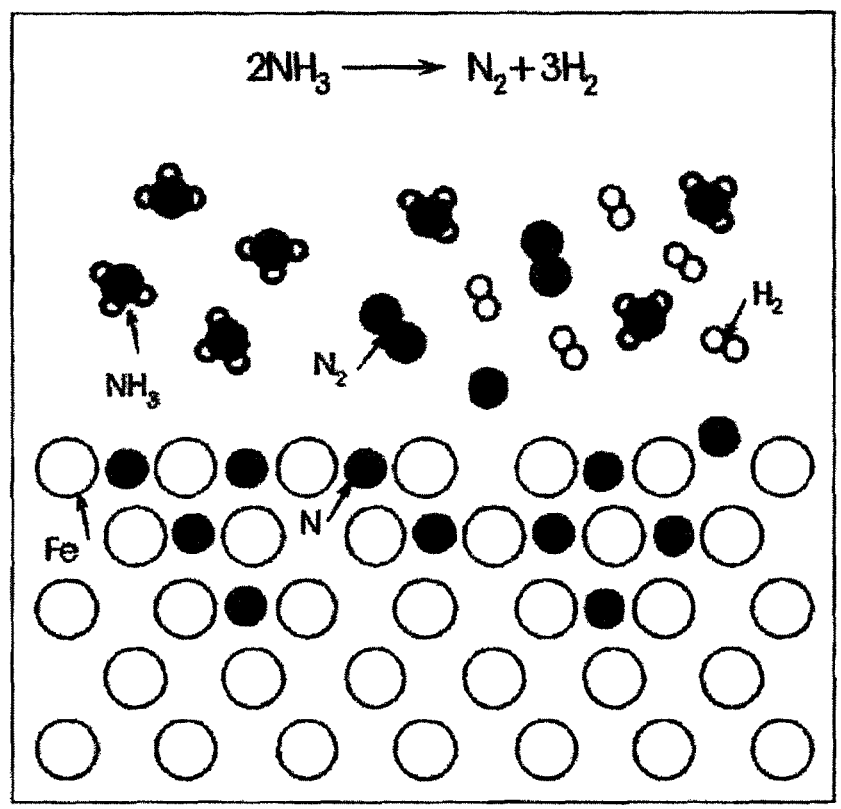
FIG. 1—it is a scheme of the gaseous nitriding process where it is possible to observe the dissociation of ammonia to nitrogen and respective absorption by the steel.
Figure 2:
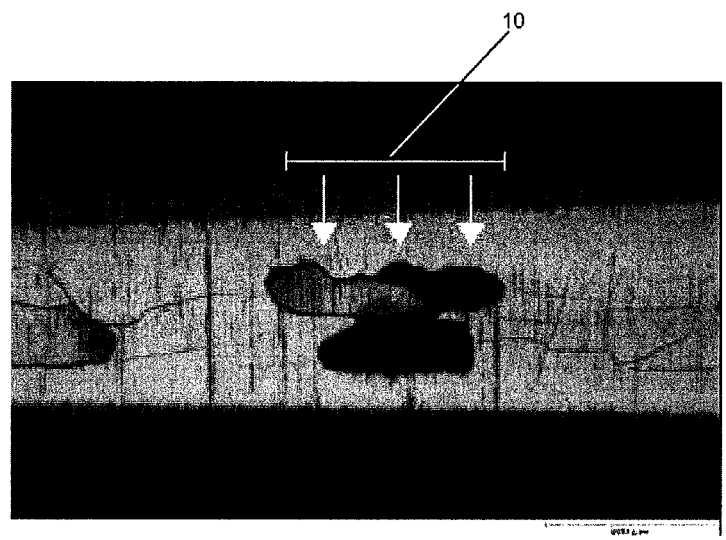
FIG. 2—a metallographic photograph of a sliding face of a piston ring in the prior art.
Figure 3:
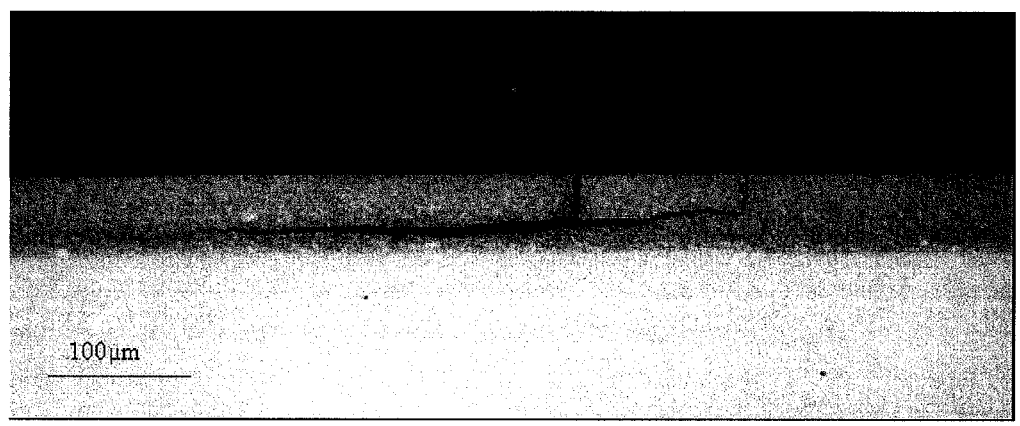
FIG. 3—a metallographic photograph of a transverse section of a piston ring in the prior art.

FIGS. 2 and 3 illustrate a piston ring in the prior art; there, the formation and propagation of cracks and the consequent spalling 10 are evident, which are precisely the problems solved by this ring.

FIGS. 4 and 5 show, respectively, a piston ring in the prior art 101 and a ring of this invention 100 and they are very important for understanding this invention, reason why they will be repeatedly discussed in this report. We should preliminarily describe that both FIGS. 4 and 5 illustrate metallographic images of transverse sections of piston rings after they underwent a chemical attack of the Murakami type, in order to make the carbides present in the microstructure evident.

FIG. 4, when compared to FIG. 5, clearly shows essential differences in the base that notoriously validate the advance of this invention compared to the prior art. FIG. 4 shows a typical GNS ring where there is only one nitrided diffusion layer 4, which is followed by metallic base 5.

Figure 15:
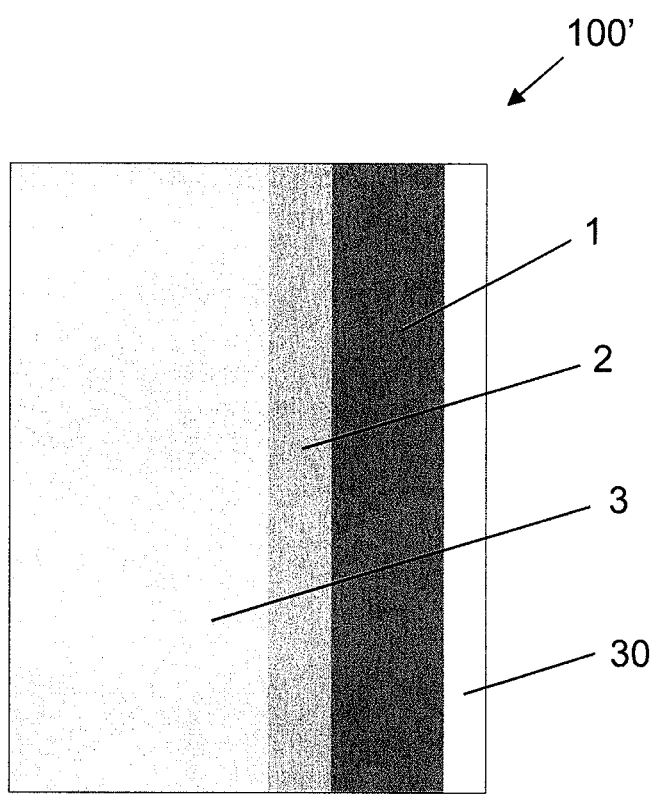
FIG. 15—a schematic view of a variation of the piston ring object of this invention, including the application of a coating layer afterwards, over the first nitrided layer.

FIG. 5 represents the ring object of this invention, which is essentially equipped with a base 3 and at least one first 1 and one second nitrided layers 2. The so called first layer 1 is directed to the outside and it is the external layer in most situations, unless a third layer of any coating 30 is applied (a 100' ring formed like this, which constitutes a variation of this invention, is illustrated in FIG. 15 and will be described with more details below). As for the second layer 2, it is the one positioned between the first layer 1 and the base 3.

In FIG. 5 we can clearly see the two diffusion layers 1, 2 resulting from the innovative nitriding process, in that the great novelty is the existence of a second layer 2, very distinct and defined, unlike the solutions in the prior art.

It is, therefore, very noticeable in the ring of this invention, the existence of a second layer 2, very rich in carbides when compared to the ring in the prior art 101, since in FIG. 4 the distribution of carbides after the nitrided layer 4 is much more homogeneous, the existence of an intermediary layer not being evident such as the second layer 2. FIG. 5 evidently shows, therefore, a novelty (precisely the presence of a second layer of carbides, intermediary, 2). It is also possible to observe the approximate inexistence of carbides on the first layer 1, a fact which is also extraordinarily new when compared to the common existence of carbides in the nitrided phase 4 of the prior art (this point will be timely discussed in this report).

Such characteristics regarding the concrete existence of a diffusion layer 4 in the prior art 101 and of two diffusion layers 1,2 of this invention 100 can also be seen in FIGS. 6 and 7 that represent the microstructure of the prior art 101 and of this invention 100, respectively.

We can define, then, that in a preferable, but not mandatory, concretization of the object of invention, the nitrided piston ring 100 has hardness of about 650 Vickers, a value very below the one typically used for this type of application, defined by two layers of diffusion 1, 2 in order to have the softest possible hardness gradient and a nitriding layer with a total of about 60 microns (μm). It becomes extremely important to point out that a ring in the prior art 101, which has only one diffusion layer 4, has superficial hardness of about 1000 Vickers, as well as a much higher hardness gradient.

During the phase of product development, a piston ring object of this invention 100 and a ring in the prior art 101 participated in a field test for comparison regarding the resistance to spalling and formation of cracks, although a logical increase in the wear rate of the ring of this invention 100 was expected due to its inferior hardness. The purpose of this field test was to acquire base information to be used as guidance for later developments.

Figure 8:
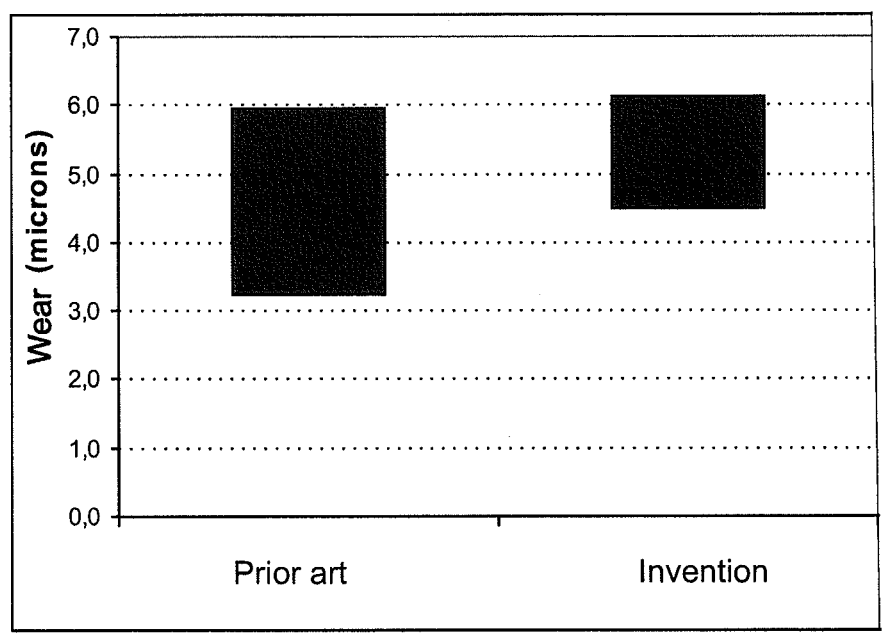
FIG. 8—a comparison graph of the wear of a piston ring in the prior art in contrast to a ring object of this invention.

Surprisingly, and as shown in FIG. 8, the tests conducted revealed that the ring of this invention 100 did not have, as initially expected, wear resistance inferior to the typical GNS ring 101. Additionally, it was observed that the ring of this invention 100 resisted to the formation of cracks perpendicularly to the surface, which normally occurs in the typical GNS ring 101, cracks which trigger and are responsible for the spalling process of the nitrided layer. Thus, an unexpected effect was met, obtaining, therefore, as a result, a ring especially appropriate for the operation in Flex-fuel engines which use ethanol as fuel.

The result of a series of tests, described below, shows very important differences between the prior art 101 and the current invention 100, showing the existence also of a change of paradigm in the action area under discussion.

By means of more detailed studies, it was possible to observe one of the reasons that make it possible for the ring of this invention 100 to resist to the propagation of cracks. FIGS. 9 and 10 show, respectively, a ring in the prior art 101 and a ring of this invention 100. By looking at these two figures it is possible to compare the result after a chemical attack to reveal the presence of carbides, on the nitriding surface. In FIG. 9, the precipitation of carbides on the grain boundaries is very visible, in a more or less parallel manner to the nitride surface 4, as if forming an "orange peel" pattern. Contrarily, in FIG. 10, it is possible to observe the absence of precipitation of carbides on the first layer 1.

The result described above is another piece of evidence of an excellent purpose met for this type of product, since the presence of the referred "orange peel" in the material in the prior art 101 grants to the material a certain rugosity which, when with work load, will make it possible for the high attrition forces acting to enable a propagation of superior tensions through the grain boundaries which, inevitably, will try to unload such concentrated energy, which, depending on the tenacity of the material, will give rise to the propagation of cracks with the consequent spalling of the nitride layer.

Please note that FIG. 10 shows the total absence of precipitation of carbides, making evident, only with this exclusive characteristic, that the material is much more apt to resist to the work loads through which it will go. As referred, this is a highly desirable characteristic in a nitriding process of a material with application and which, until today, has shown to be tremendously difficult to obtain. Once again, the unexpected effect appears.

Figure 11:
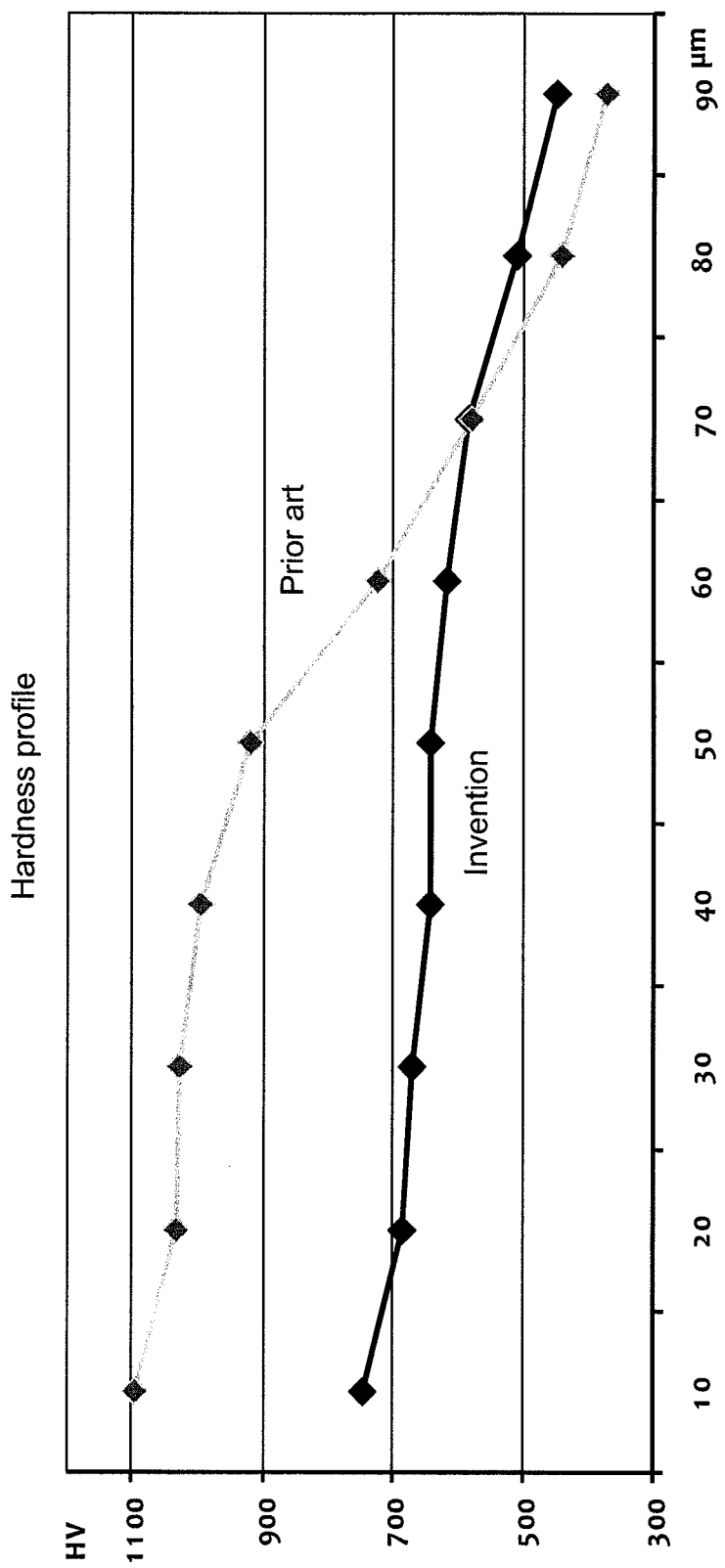
FIG. 11—a graph that shows the hardness profiles of a piston ring in the prior art and of the piston ring object of this invention.

The correlation of the previous images makes it necessary to mention the tenacity characteristic, and, in order to better explain this topic, we must observe the hardness graph in FIG. 11.

Based on the graph of hardness profiles, we can conclude that the piston rings in the prior art 101 aim at guaranteeing much superior hardness in the area of the nitride layer. This means that at a distance of about 50 microns (μm) from the surface of the ring to the inside part of the material, the hardness was above 1000 Vickers and that, after the nitrided layer, the hardness decreased very sharply, being around three times lower for a distance to the surface above 80 microns (μm). This was the paradigm that prevailed and guided the development of nitrided piston rings for pistons during the last years.

The preferable, but not mandatory concretization of the object of invention shows that, in a surprisingly different manner, the object of this invention has an exceptionally different hardness profile. The maximum hardness reached is near the 800 Vickers and has a reduction behavior that is almost linear as it penetrates towards the metallic base 3, having a value of about 400 Vickers for a distance (depth) of 90 microns (μm) from the surface (or from the most external portion of the first coating layer 1, if the ring has the application of another coating layer, which we will discuss further below). Thus, the microstructure of the piston ring of this invention 100 brings a standard of nitrided matrix that is very innovative and differentiated comparing to the typical GNS ring 101.

Figure 12:
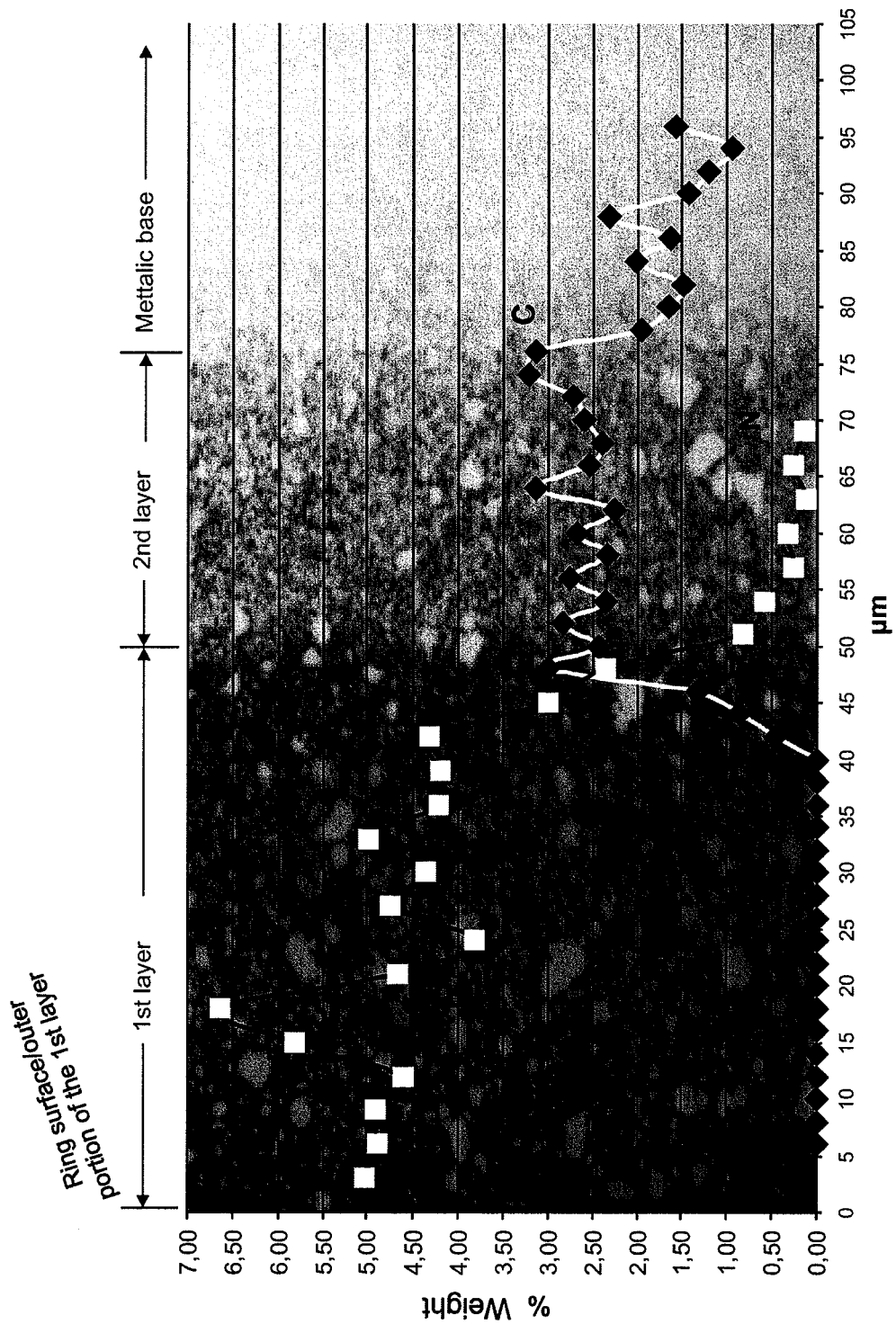
FIG. 12—a metallographic photograph of a piston ring object of this invention where it is possible to identify two distinct layers, as well as the curves of the different concentrations of carbon and nitrogen according to each layer.

Together with the description above, the metallographic photograph of FIG. 12 shows a ring object of this invention where it is possible to identify two distinct nitrided layers 1,2, as well as the curves of the different concentrations of carbon 6 and nitrogen 7 according to each nitrided layer 1,2 for better documenting the unexpected and innovative characteristics of the ring object of this invention 100.

First, by observing a preferable, but not mandatory concretization of the object of the invention by means of FIG. 12, one can conclude that the first layer 1 of nitriding has a concentration of nitrogen 7 that varies between 3% and 6.5% in weight for a depth (in this case, the distance from the surface, since there is no coating layer applied afterwards) of up to 45 microns (μm). These values may be considered normal for a process of this type; however, the values of carbon 6 are in 0% in weight up to a depth (in this case, the distance from the surface, since there is no coating layer applied afterwards) of 40 microns (μm), an atypical situation, starting to increase in the area of interconnection of the first layer 1 with the second layer 2, in that as of the beginning of the second layer 2, which corresponds to a depth (in this case, the distance from the surface, since there is no coating layer applied afterwards) of 50 microns (μm) from the surface, the values of carbon 7 rise to values between 2% and 3.5% in weight. These carbon values are present in the defined second layer 2 up to a depth (in this case, the distance from the surface, since there is no coating layer applied afterwards) of about 75 microns (μm), moment after which we enter the area of the metallic base 3 and the carbon starts to have a value of 1.5% in weight, typical value of the alloy used and where, naturally, there is no longer the presence of nitrogen 7.

The most important and unusual observations one can make come from particularities in the nitriding process from which this invention results and they show that, during the nitriding process, all carbon 6 present on the first layer 1 was "pushed" by the nitrogen 7 to the second layer 2, a fact which resulted in the absence of precipitation of iron carbides, which can be seen in FIG. 10. As a result of this phenomenon, the totality of carbon 6 proceeding from the first layer 1 allowed the densification of carbon 6 which led to the formation of a well defined second layer 2.

These innovative characteristics result in a material with absolutely desirable properties, already discussed and which can be, in part, verified by observing FIGS. 13 and 14.

FIG. 13 shows a nitrided ring of the prior art 101 which reveals the result of a scratch test where, in addition to the arc cracks, there is the presence of Forward Chevron Tensile cracks, indicators of fragile fracture. As for FIG. 14, it shows a photograph of a nitrided ring of this invention 100 that reveals one of the various results obtained in scratch tests, where the exclusive presence of arc cracks make evident that it is a more tenacious material than the prior art 101.

As an example, the product developed is preferably, but not mandatorily, a piston ring, which can be applied as compression ring, with a metallic base composed mainly of iron, more particularly, stainless steel of martensitic, tempered type, and with high content of chromium (Cr superior to 8%), the ring being submitted to a nitriding treatment. Unlike the rings in the prior art 101 which tried to reach always the highest degree of hardness possible, above 1100 Vickers (Hv) aiming at guaranteeing good wear resistance, this invention approaches this issue in a different manner, presenting superficial hardness of, at the most, about 800 Vickers and, instead of only one nitrided layer present in the prior art, it comes with double stage nitriding, that is to say, two layers 1, 2 with total thickness of 90 microns (μm).

This new, unheard-of fact, proving the novelty and inventiveness of this invention, is also confirmed by the own technical literature available. According to the compendium *ASM Handbook of Heat Treating* (ASM Handbook, volume 4 *Heat Treating*), the most important guideline and very respected book, renowned around the world in the metallurgy area, the nitriding temperature for all steels is situated between 495° C. and 565° C. Following these indications, it is easy to reach superficial hardness for stainless steels of about 1200 Vickers. According to the book, the hardness obtained by the nitrided layer is directly related to the wear resistance for the piston rings (the higher the hardness, the higher the wear resistance of the ring).

Without forgetting the presupposition of the paragraph above and paying attention to the characteristics of this invention, we notice that, due to particularities of the process, the rings of this invention 100 underwent nitriding treatment beyond the conventional parameters described above and reveal results that are extraordinarily surprising regarding the spalling resistance, observing that there was no loss regarding the properties of wear resistance, namely for the applications in Flex-fuel engines. These results were obtained although the superficial hardness of the rings of this invention 100 are of about 800 Vickers at the most, a value much below the typical 1100 Vickers of the rings in the prior art 101.

Thus, we can summarize that what was obtained is a material with superficial hardness very inferior to the prior art, hardness which has a substantially linear behavior, capable of granting, even with lower hardness, wear resistance equivalent to the prior art, promoting a material that hinders the propagation of cracks and, consequently, is free from spalling when applied to rings for operation in Flex-fuel engines. These results prove that these innovative correlations of determining a maximum superficial hardness, much below the values of the prior art, result in an increase in the tenacity.

It is also important to mention that the superficial nitriding treatment results now in two evident nitriding layers, the first layer 1 and the second layer 2. These layers also have a new behavior, because on the first layer 1 the presence of carbon is substantially 0% in weight, because the absorption of nitrogen during the nitriding process promoted the total migration of the carbon from the first layer 1 to the second layer 2, which naturally means that this second layer 2 has a percentage of carbon in weight superior to the metallic base 3 of the piston ring 100. For example, for a steel of 1.5% in weight of carbon on the metallic base, we can expect an increase of carbon on the second layer 2 to at least about 2% in weight of carbon. It is important to mention that in the prior art there has always been residual carbon in the nitriding area 4. It is also important to mention that the propagation of cracks became unviable in this material because, as we could see (FIG. 3) starting with a hardness of about 600 Vickers, the material is tenacious enough for it not to propagate. In this invention we work with values that are very close to this one, in addition to the fact that the immunity of precipitation of carbides in the first layer 1 also contributes to inhibit the respective propagation of cracks.

We have, therefore, preferably, but not mandatorily, a material whose maximum superficial hardness is of 800 Vickers and it decreases linearly to a value that will be at least of about 500 Vickers at a depth (in this case, the distance from the surface, since there is no coating layer applied afterwards) which may vary in values between 35 microns (μm) and 55 microns (μm), at the end of the first layer 1 (see FIG. 12). Then comes a second layer 2 whose hardness continues the linear behavior of the previous layer, bringing values which may vary from at the most about 600 Vickers to a minimum hardness of 400 Vickers, these values being found between thicknesses of the second layer that are between a minim of about 15 microns (μm) until a maximum of about 30 microns (μm), following after the nitrided area to the metallic base of the piston ring.

As mentioned earlier, the scope of this invention also includes a ring 100' equipped with at least one additional coating layer 30 applied afterwards over the first layer 1. In this product, the first layer 1 is no longer the external layer, considering the application of this additional layer(s) afterwards 30 over it. Therefore, the ring 100' now has three or more coating layers.

At least one third coating layer 30, applied afterwards over the first layer 1, can have any composition, thickness and even be applied by any deposition process, and still the resulting ring 100' will be included in the scope of protection of the invention, even because this third coating layer 30 in itself does not have any innovative characteristic. As mentioned above, the characteristics of this ring 100' are in the characteristics of thickness and composition of the first and second layers, as mentioned earlier.

In this second variation, the application of at least one third coating layer 30 occurs after the achievement of the nitriding process that causes the formation of the first and second layers 1,2.

Therefore, for this second variation of ring, all the characteristics mentioned above also apply, however the values referring to depths, especially to determine the values of hardness, are counted not as from the surface, but from the most external portion of the first layer 1, over which the third coating layer 30 is applied. Therefore:

(i) The maximum hardness reached for the second variation of the ring 100' is near 800 Vickers and has a reduction behavior almost linear as it goes towards the metallic base 3, having a value of about 400 Vickers for a distance (depth) of 90 microns (μm) counted from the most external portion of the first coating layer 1.

(ii) The first nitriding layer 1 has a concentration of nitrogen 7 that varies between 3% and 6.5% in weight, up to 45 microns (μm) counted from the most external portion of the first coating layer 1.

(iii) The values of carbon 6 are at 0% at a distance of 40 microns (μm) taken from the most external portion of the first coating layer, starting to increase in the interconnection area of the first layer 1 with the second layer 2, in that from the beginning of the second layer 2, which corresponds to a depth (taken from the most external portion of the first coating layer 1) of 50 microns (μm), the values of carbon 7 skyrocket to values between 2% and 3.5% in weight.

(iv) The values of carbon are present in the second defined layer 2 until a depth (taken from the most external portion of the first coating layer 1) of about 75 microns (μm), moment as of which we enter the area of metallic base 3 and the carbon starts having a value of 1.5% in weight, typical value of the alloy used and where, naturally, there is no presence of nitrogen 7 anymore.

Having described examples of preferred concretizations, we must understand that the scope of this invention comprehends other possible variations, limited only by the content of the claims attached, including the possible equivalent ones.

The invention claimed is:

1. Nitrided piston ring (100,100') equipped with a metallic base composed fundamentally of iron to which one first layer (1) is associated, wherein the ring further comprises one second layer (2) positioned between the base (3) and the first layer (1), the first layer (1) having at least 2% of nitrogen in weight and a hardness of, at the most, 800 Vickers varying in a substantially linear manner until a minimum hardness of 400 Vickers at a depth of 85 microns (μm) counted as of the most external portion of the first layer, the second layer (2) having a percentage of carbon in weight at least fractionally superior to the percentage of carbon in weight present in the base (3) and thickness at least one of higher or equal to at least 15 microns (μm).

2. Nitrided piston ring (100,100') according to claim 1, wherein the base (3) is composed of an alloy of martensitic stainless steel.

3. Nitrided piston ring (100,100') according to claim 1, wherein the first layer (1) corresponds to the external, or outside, layer of the ring.

4. Nitrided piston ring (100,100') according to claim 1, wherein the first layer (1) has a quantity of carbon substantially lower than 0.05 percent in weight.

5. Nitrided piston ring (100,100') according to claim 1, wherein the first layer (1) has a quantity of carbon of substantially zero percent in weight.

6. Nitrided piston ring (100,100') according to claim 1, wherein the second layer (2) has a percentage of carbon equal or superior to 1.5 percent in weight.

7. Nitrided piston ring (100,100') according to claim 1, wherein the first layer (1) has a minimum thickness of approximately (35) microns (μm).

8. Nitrided piston ring (100,100') according to claim 1, wherein the ring has a a minimum hardness superior to 500 Vickers at a depth of 55 microns (μm) counted as of its external surface.

9. Nitrided piston ring (100,100') according to claim 1, wherein the ring has a minimum hardness above 500 Vickers at a depth of 55 microns (μm) counted as of the most external portion of the first layer (1).

10. Nitrided piston ring (100,100') according to claim 1, wherein the ring has a maximum hardness of up to 600 Vickers at a depth of 60 μm counted as of its external surface.

11. Nitrided piston ring (100,100') according to claim 1, wherein the ring has a maximum hardness of up to 600 Vickers at a depth of 60 μm counted as of the most external portion of the first layer (1).

12. Nitrided piston ring (100,100') according to claim 1, wherein the ring has a minimum hardness above 400 Vickers at a depth of 85 microns (μm) counted as of its external surface.

13. Nitrided piston ring (100,100') according to claim 1, wherein the ring has a minimum hardness above 400 Vickers at a depth of 85 microns (μm) counted as of the most external portion of the first layer (1).

14. Nitrided piston ring (100,100') according to claim 1, wherein the first layer (1) does not have precipitation of carbides.

15. Nitrided piston ring (100,100') according to claim 1, wherein the second layer (2) does not have precipitation of carbides.

16. Nitrided piston ring (100,100') according to claim 1, wherein the ring does not propagate cracks in the area of the first layer (1).

17. Nitrided piston ring (100,100') according to claim 1, wherein the ring is applied in one or more Flex-fuel engines.

18. Nitrided piston ring (100') according to claim 1, wherein the ring comprises at least one additional coating layer (30) applied afterwards over the first layer (1).

* * * * *

UNITED STATES PATENT AND TRADEMARK OFFICE
CERTIFICATE OF CORRECTION

PATENT NO. : 8,561,998 B2  
APPLICATION NO. : 13/519219  
DATED : October 22, 2013  
INVENTOR(S) : Marques et al.

It is certified that error appears in the above-identified patent and that said Letters Patent is hereby corrected as shown below:

Title Page

Item "(73) Assignee: MAHLE International GmbH, Stuttgart (DE)" should read

--(73) Assignees: MAHLE Metal Leve S/A, Jundiaí, SP (BR);

MAHLE International GmbH, Stuttgart (DE)--

Signed and Sealed this
Twenty-eighth Day of January, 2014

Michelle K. Lee
*Deputy Director of the United States Patent and Trademark Office*